(12) United States Patent
Jing et al.

(10) Patent No.: US 7,644,373 B2
(45) Date of Patent: Jan. 5, 2010

(54) USER INTERFACE FOR VIEWING CLUSTERS OF IMAGES

(75) Inventors: Feng Jing, Beijing (CN); Lei Zhang, Beijing (CN); Ming Jing Li, Beijing (CN); Wei-Ying Ma, Beijing (CN); Kefeng Deng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 11/337,945

(22) Filed: Jan. 23, 2006

(65) Prior Publication Data

US 2007/0174790 A1    Jul. 26, 2007

(51) Int. Cl.
*G06F 3/048*    (2006.01)
*G06F 7/00*    (2006.01)

(52) U.S. Cl. ..................... 715/838; 707/104.1
(58) Field of Classification Search ................. 715/233, 715/838; 707/104.1
See application file for complete search history.

(56) References Cited

U.S. PATENT DOCUMENTS

| 5,751,286 | A | * | 5/1998 | Barber et al. ............... 715/835 |
| 5,870,740 | A | | 2/1999 | Rose et al. |
| 5,875,446 | A | | 2/1999 | Brown et al. |
| 5,937,422 | A | | 8/1999 | Nelson et al. |
| 6,006,218 | A | | 12/1999 | Breese et al. |
| 6,097,389 | A | * | 8/2000 | Morris et al. ............... 715/804 |
| 6,128,613 | A | | 10/2000 | Wong et al. |
| 6,256,623 | B1 | | 7/2001 | Jones |
| 6,321,226 | B1 | | 11/2001 | Garber et al. |
| 6,363,373 | B1 | | 3/2002 | Steinkraus |
| 6,370,527 | B1 | | 4/2002 | Singhal |
| 6,470,307 | B1 | | 10/2002 | Turney et al. |

(Continued)

FOREIGN PATENT DOCUMENTS

KR    10-2001-0105051 A    11/2001

(Continued)

OTHER PUBLICATIONS

Liu, Hao; Xie, King; Tang, Xiaoou; Li, Zhi-Wei; Ma, Wei-Ying, Effective Web Browsing of Web Image Search Results, Oct. 15-16, 2004, MIR '04.*

(Continued)

*Primary Examiner*—Ting Lee
*Assistant Examiner*—Ashraf Zahr
(74) *Attorney, Agent, or Firm*—Perkins Coie LLP

(57) ABSTRACT

A method and system for providing a user interface for presenting images of clusters of an image search result is provided. The user interface system displays the search result in a cluster/view form using a cluster panel and a view panel. The cluster panel contains a cluster area for each cluster. The view panel may contain thumbnails of images of the search result in a list view or a mix view. When a user selects a cluster area from the cluster panel, the user interface system displays a list view of thumbnails for that cluster in the view panel. The user interface system may display a thumbnail list near a cluster area of the cluster panel. The thumbnail list contains mini-thumbnails of the images of the selected cluster. The user interface system may also display a detail view of an image in the view panel when a user selects an image.

6 Claims, 15 Drawing Sheets

U.S. PATENT DOCUMENTS

| | | | |
|---|---|---|---|
| 6,523,021 | B1 | 2/2003 | Monberg et al. |
| 6,549,897 | B1 | 4/2003 | Katariya et al. |
| 6,567,936 | B1 | 5/2003 | Yang et al. |
| 6,578,032 | B1 | 6/2003 | Chandrasekar et al. |
| 6,606,659 | B1 | 8/2003 | Hegli et al. |
| 6,643,641 | B1 | 11/2003 | Snyder |
| 6,704,729 | B1 | 3/2004 | Klein et al. |
| 6,728,752 | B1 | 4/2004 | Chen et al. |
| 6,748,387 | B2 | 6/2004 | Garber et al. |
| 6,766,320 | B1 | 7/2004 | Wang et al. |
| 6,775,666 | B1 | 8/2004 | Stumpf et al. |
| 6,823,335 | B2 | 11/2004 | Ikeda et al. |
| 6,895,552 | B1 | 5/2005 | Balabanovic et al. |
| 6,944,612 | B2 | 9/2005 | Roustant et al. |
| 6,978,275 | B2 | 12/2005 | Castellanos et al. |
| 7,010,751 | B2 * | 3/2006 | Shneiderman ............... 715/232 |
| 7,017,114 | B2 | 3/2006 | Guo et al. |
| 7,047,482 | B1 | 5/2006 | Odom |
| 7,051,019 | B1 | 5/2006 | Land et al. |
| 7,065,520 | B2 | 6/2006 | Langford et al. |
| 7,099,860 | B1 | 8/2006 | Liu et al. |
| 7,158,878 | B2 | 1/2007 | Rasmussen et al. |
| 7,162,468 | B2 | 1/2007 | Schwartz et al. |
| 7,287,012 | B2 | 10/2007 | Corston et al. |
| 2001/0049700 | A1 | 12/2001 | Ichikura |
| 2003/0023600 | A1 | 1/2003 | Nagamura et al. |
| 2003/0063131 | A1 * | 4/2003 | Ma ............................. 345/838 |
| 2003/0126235 | A1 | 7/2003 | Chandrasekar et al. |
| 2003/0142123 | A1 * | 7/2003 | Malamud et al. ............ 345/715 |
| 2004/0015461 | A1 | 1/2004 | Lo |
| 2004/0044469 | A1 | 3/2004 | Bender et al. |
| 2004/0225667 | A1 | 11/2004 | Hu et al. |
| 2004/0249774 | A1 | 12/2004 | Caid et al. |
| 2005/0015366 | A1 * | 1/2005 | Carrasco et al. ................ 707/3 |
| 2005/0097475 | A1 * | 5/2005 | Makioka et al. ............. 715/792 |
| 2005/0108200 | A1 | 5/2005 | Meik et al. |
| 2005/0165841 | A1 * | 7/2005 | Kasperkiewicz et al. . 707/104.1 |
| 2005/0188326 | A1 * | 8/2005 | Ikeda ........................... 715/788 |
| 2006/0026152 | A1 | 2/2006 | Zeng et al. |
| 2006/0242178 | A1 | 10/2006 | Butterfield et al. |
| 2007/0174269 | A1 * | 7/2007 | Jing et al. ....................... 707/5 |
| 2007/0174865 | A1 | 7/2007 | Jing et al. |
| 2007/0174872 | A1 | 7/2007 | Jing et al. |
| 2007/0209025 | A1 | 9/2007 | Jing et al. |
| 2008/0086468 | A1 | 4/2008 | Jing et al. |
| 2008/0086686 | A1 | 4/2008 | Jing et al. |

FOREIGN PATENT DOCUMENTS

| | | |
|---|---|---|
| KR | 10-2002-0000680 A | 1/2002 |
| KR | 10-2003-0023950 A | 3/2003 |

OTHER PUBLICATIONS

Schwartz, Steve, Visual Quick Project Guide: Organizing and Editing Your Photos with Picasa, May 10, 2005, Chapter 4.*

Xiaofei He, Wei-Ying Ma, and Hongjiang Zhang, Imagerank : spectral techniques for structural analysis of image database, Jul. 6-9, 2003, Multimedia and Expo, 2003. ICME '03. Proceedings. 2003 International Conference, vol. 1, pp. 1-25-1-28.*

Deng Cai1 Xiaofei He2 Zhiwei Li Wei-Ying Ma and Ji-Rong Wen, Hierarchical Clustering of WWW image Search Results Using Visual, Textual and Link Information, Oct. 10-16, 2004, New York, New York, USA. Copyright 2004 ACM.*

U.S. Appl. No. 11/337,825, filed Jan. 23, 2006, Jing et al.

Brin, Sergey and Lawrence Page, "The anatomy of a large-scale hypertextual (Web) search engine," In the 7th International World Wide Web Conference, 1998.

Broder, Andrei, "A taxonomy of web search," SIGIR Forum 36(2), 2002, 8 pages.

Cai, Deng et al., "Hierarchical Clustering of WWW Image Search Results Using Visual, Textual and Link Analysis," MM'04, Oct. 10-16, 2004 New York, New York, © 2004 ACM.

Chang, Shi Kuo and Arding Hsu, "Image Information Systems: Where do we go from here?," IEEE Transactions on Knowledge and Data Engineering, vol. 4, No. 5, Oct. 1992, pp. 431-442.

Chen, Hao and Susan Dumais, "Bringing Order to the Web: Automatically Categorizing Search Results," Proceedings of CHI'00, Human Factors in Computing Systems, pp. 145-152.

Dumais, Susan, Edward Cutrell and Hao Chen, "Optimizing Search by Showing Results In Context," SIGCHI'01, Mar. 31-Apr. 4, 2001, Seattle, Washington, © 2001 ACM.

Frankel, Charles, Michael J. Swain and Vassilis Athitsos, "WebSeer: An Image Search Engine for the World Wide Web," Aug. 1, 1996, Technical Report 96-14, Computer Science Department, The University of Chicago.

Glance, Natalie S., "Community Search Assistant," IUI'01, Jan. 14-17, 2001, Santa Fe, New Mexico, © 2001 ACM, pp. 91-96.

Google image search, http://images.google.com, [last accessed Jun. 7, 2007].

Google web search, http://www.google.com, [last accessed Jun. 7, 2007].

Hearst, Marti A. and Jan O. Pedersen, "Reexamining the Cluster Hypothesis: Scatter/Gather on Retrieval Results," In the Proceedings of ACM SIGIR, Aug. 1996, Zurich.

Huang, Jing et al., "Image Indexing using color correlograms," In Proc. IEEE Comp. Soc. Conf. Comp. Vis. and Patt. Rec., 1997, pp. 762-768.

Jansen, Major Bernard J. et al., "Real life information retrieval: a study of user queries on the Web," ACM SIGIR Forum 1998, vol. 32, No. 1, pp. 5-17.

Lempel, Ronnya and Aya Soffer, "PicASHOW: Pictorial Authority Search by Hyperlinks on the Web," Proceedings of the 10th International WWW Conference, Hong Kong, China, 2001, ACM, pp. 438-448.

Liu, Hao et al., "Effective Browsing of Web Image Search Results," MIR'04, Oct. 15-16, 2004, New York, New York, © 2004 ACM.

Luo, Bo, Xiaogang Wang and Xiaoou Tang, "A World Wide Web Based Image Search Engine Using Text and Image Content Features," Internet Imaging IV, Proceedings of SPIE- IS&T, Electronic Imaging, SPIE, vol. 5018, 2003, © 2003 SPIE-IS&T, pp. 123-130.

MSRA clustering search, http://rwsm.directtaps.net/, [last accessed Jun. 7, 2007].

Photosig, http://www.photosig.com, [last accessed Aug. 17, 2006].

Picsearch image search, http://www.picsearch.com, [last accessed Jan. 5, 2006].

Rui, Yong and Thomas S. Huang, "Image Retrieval: Current Techniques, Promising Directions and Open Issues", Journal of Visual Communication and Image Representation, vol. 10, 39-62, Mar. 1999, © 1999 by Academic Press.

Sclaroff, Stan, Leonid Taycher and Marco Lacascia, "ImageRover: A Content-Based Image Browser for the World Wide Web," In IEEE Workshop on Content-based Access of Image and Video Libraries, San Juan, Puerto Rico, Jun. 1997, pp. 2-9.

Shen, Heng Tao et al., "Giving Meanings to WWW Images," Proceedings of ACM Multimedia 2000, Los Angeles, CA, pp. 39-47, ©ACM 2000.

Smeulders, Arnold W.M. et al., "Content-Based Image Retrieval at the End of the Early Years," IEEE Transactions on Pattern Analysis and Machine Intelligence, vol. 22, No. 12, Dec. 2000, pp. 1349-1380, ©2000 IEEE.

Smith, John R. and Shih-Fu Chang, "Visually Searching the Web for Content," IEEE Multimedia, 1997, pp. 12-20, ©1997 IEEE.

Teevan, Jaime et al., "The Perfect Search Engine Is Not Enough: A Study of Orienteering Behavior in Directed Search," CHI 2004, Apr. 24-29, Vienna, Austria, , pp. 415-422.

Vivisimo clustering search, http://vivisimo.com, [last accessed Jun. 7, 2007].

Wang, Xin-Jing et al., "Grouping Web Image Search Result," MM'04, Oct. 10-16, 2004, New York, New York, pp. 436-439, © 2004 ACM.

White, David A. and Ramesh Jain, "Similarity Indexing: Algorithms and Performance," 2 / SPIE, Feb. 1-2, 1996, San Jose, California, vol. 2670, pp. 63-73, © 1996 The Society of Photo-Optical Instrumentation Engineers.

Woodruff, Allison et al., "Using Thumbnails to Search the Web," Proceedings of SIGCHI, Mar. 31-Apr. 4, 2001, Seattle, Washington, pp. 198-205, © 2001 ACM.

Yahoo Homepage search, http://www.yahoo.com/, [last accessed Jun. 7, 2007].

Yahoo image search, http://images.search.yahoo.com/, [last accessed Jun. 7, 2007].

Zamir, Oren and Oren Etzioni, "Web Document Clustering: A Feasibility Demonstration," In Proceedings of SIGIR'98, Melbourne, Australia, pp. 46-54, © 1998 ACM.

Zeng, H.J. et al, "Learning to Cluster Web Search Results," SIGIR'04, Jul. 25-29, 2004. Sheffield, South Yorkshire, UK, ©2004 ACM.

Zhang, L. et al., "Enjoy High Quality Photos in Vertical Image Search Engine," Submitted to the SIGCHI 2006 Conference on Human Factors in Computing Systems.

Altavista image, http://www.altavista.com/images, one page [last accessed Jul. 14, 2006].

Chau, Michael et al., "Personalized Spiders for Web Search and Analysis," JCDL'01, Jun. 24-28, 2001, Roanoke, Virginia, © 2001, ACM.

Chen, Zheng et al., "iFind: A Web Image Search Engine," In Proc. ACM SIGIR, 2001, one page.

Citeseer, Scientific Literature Digital Library, http://citeseer.ist.psu.edu, one page [last accessed Jul. 14, 2006].

Ditto, http://ditto.com/, one page [last accessed Jul. 14, 2006].

Froogle, Google product search, http://froogle.google.com, one page [last accessed Jul. 14, 2005].

Google Maps, Google local search, http://local.google.com/, one page [last accessed Jul. 14, 2006].

GoogleNews, Google news search, http://news.google.com, 4 pages [last accessed Jul. 14, 2006].

GoogleVideo, Google video search, http://video.google.com, one page [last accessed Jul. 14, 2006].

Halkidi, Maria et al., "THESUS: Organizing Web document collections based on link semantics," The VLDB Journal (2003) / Digital Object Identifier, ©Springer-Verlag 2003, pp. 1-13.

Han, Eui-Hong et al., "Intelligent Metasearch Engine for Knowledge Management", CIKM'03 Nov. 2003, pp. 492-495, ACM, New Orleans, Louisiana.

Huang, Xiaodi and Wei Lai, "Force-Transfer: A New Approach to Removing Overlapping Nodes in Graph Layout," In Proc. The 25th Australasian Computer Science Conference 2003, Conferences in Research and Practice in Information Technology, vol. 16, ©2003 Australian Computer Society, 10 pages.

IMDB, Formula for calculating the top rated 250 titles in imdb, http://www.imdb.com/chart/top, 8 pages [last accessed Jul. 14, 2006].

Krishnapuram, Raghu et al., "Low-Complexity Fuzzy Relational Clustering Algorithms for Web Mining," Aug. 2001, IEEE, vol. 9, Issue 4, pp. 595-607.

Kummamuru, Krishna, et al., "A Hierarchical Monothetic Document Clustering Algorithm for Summarization and Browsing Search Results", WWW 2004, May 2004, pp. 658-665, ACM, New York, NY.

Li, Zhiwei et al., "Grouping WWW Image Search Results by Novel Inhomogeneous Clustering Method," Proceedings of the 11th International Multimedia Modelling Conference (MMM '05), © 2005 IEEE, 7 pages.

Liu, Bing et al. "Mining Topic-Specific Concepts and Definitions on the Web," WWW 2003, May 20-24, 2003, Budapest, Hungary, ACM.

Mana-Lopez, Manuel et al., "Multidocument Summarization: Added Value to Clustering in Interactive Retrieval, ACM Transactions on Information Systems", Apr. 2004, pp. 215-241, vol. 22 No. 2. ACM.

Mukherjea, Sougata, Kyoji Hirata and Yoshinori Hara, "Using Clustering and Visualization for Refining the Results of a WWW Image Search Engine," NPIV 98, Bethesda, Maryland, ©ACM 2000, pp. 29-35.

Nie, Zaiqing et al., "Object-Level Ranking: Bringing Order to Web Objects," WWW 2005, May 10-14, 2005, Chiba, Japan, ACM.

Nie, Zaiqing et al., "Object-level Web Information Retrieval," Technical Report of Microsoft Research, MSR-TR-2005-11, 2005, 8 pages.

Nie, Zaiqing, Yuanzhi Zhang, Ji-Rong Wen and Wei-Ying Ma, "Object-Level Ranking: Bringing Order to Web Objects," WWW 2005, Chiba, Japan, ACM 2005, 8 pages.

Ong, Hwee-Leng et al., "FOCI: Flexible Organizer for Competitive Intelligence," Proceedings of the 10th International Conference on Information and Knowledge Management, Oct. 5-10, 2001, Atlanta, Georgia, http://www.ntu.edu.sg/home/asahtan/Papers/foci_itwp01.pdf, [last accessed Jan. 3, 2008].

Page, L. et al., "The PageRank Citation Ranking: Bringing Order to the Web," Jan. 29, 1998, Stanford University Technical Report, pp. 1-17.

Roussinov, Dmitir et al. "Visualizing Internet Search Results with Adaptive Self-Organizing Maps," 1999, http://www.public.asu.edu/~droussi/sigir99/demo.htm, [last accessed Dec. 7, 2007].

Sarkar, Manojit and Marc H. Brown, "Graphical Fisheye Views," Communications of the ACM, Dec. 1994, vol. 37, No. 12, ®ACM, pp. 73-84.

Savakis, Andreas E., Stephen P. Etz and Alexander C. Loui, "Evaluation of image appeal in consumer photography," In Proceedings SPIE Human Vision and Electronic Imaging V, Jan. 2000, pp. 1-10.

Scholar, Google scholar paper search, http://Scholar.google.com, one page [last accessed Jul. 14, 2006].

Sclaroff, Stan, Marco La Cascia and Saratendu Sethi, "Unifying Textual and Visual Cues for Content-Based Image Retrieval on the World Wide Web," Computer Vision and Image Understanding, Vo. 75, Nos. 1/2, Jul./Aug. 1999, © 1999 by Academic Press, pp. 86-98.

Smith, John R. and Shih-Fu Chang, "Visually Searching the Web for Content," IEEE Multimedia, July-September, vol. 4, No. 3, 1997, © 1997 IEEE, pp. 12-20.

Sullivan, Danny, "Hitwise Search Engine Ratings," Search Engine Watch, www.searchenginewatch.com, Aug. 23, 2005, Incisive Interactive Marketing LLC, 2005, 3 pages.

Susstrunk, Sabine and Stefan Winkler, "Color Image Quality on the Internet," In IS&T/SPIE Electronic Imaging 2004: Internet Imaging V, vol. 5304, 2004, p. 118-131.

Tong, Hanghang et al., "Classification of Digital Photos Taken by Photographers or Home Users," In Proceedings of Pacific-Rim Conference on Multimedia (PCM), 2004, pp. 198-205.

Toyama, Kentaro et al., "Geographic Location Tags on Digital Images," MM'03, Nov. 2-8, 2003, Berkeley, California, © 2003 ACM.

Wang, Bin et al., "Large-Scale Duplicate Detection for Web Image Search," 4 pages.

Wang, Yitong et al., "Evaluating Contents-Link Coupled Web Page Clustering for Web Search Results", CIKM'02, Nov. 2002, pp. 499-506, ACM, McLean, VA.

Wu, Yi-Fang et al., "Finding Mor Useful Information Faster from Web Search Results", CIKM'03, Nov. 2003, pp. 568-571, ACM, New Orleans, Louisiana.

Xi, Wensi et al., Link Fusion: A Unified Link Analysis Framework for Multi-Type Interrelated Data Objects, WWW 2004, New York, ©ACM, pp. 319-327.

Yee, Ka-Ping et al., "Faceted Metadata for Image Search and Browsing," In Proc. CHI 2003, Florida, © 2003 ACM, 8 pages.

International Search Report and Written Opinion; International Patent No. PCT/US2007/079983; Filed: Sep. 28, 2007; Applicant: Microsoft Corporation; Mailed on Jan. 16, 2008.

Ferragina et al., "The Anatomy of a Clustering Engine for Web-page Snippets," Jan. 28, 2004, University of Pisa, Tech. Report: TR-04-05.

http://www.flickr.com, Archived on http://www.archive.org on Feb. 18, 2005, pp. 1-5, available on http://web.archive.org/web/20050218030404/http://flickr.com/.

* cited by examiner

USER INTERFACE FOR VIEWING CLUSTERS OF IMAGES

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Several search engine services also provide for searching for images that are available on the Internet. These image search engines typically generate a mapping of keywords to images by crawling the web in much the same way as described above for mapping keywords to web pages. An image search engine service can identify keywords based on text of the web pages that contain the images. An image search engine may also gather keywords from metadata associated with images of web-based image forums, which are an increasingly popular mechanism for people to publish their photographs and other images. An image forum allows users to upload their photographs and requires the users to provide associated metadata such as title, camera setting, category, and description. The image forums typically allow reviewers to rate each of the uploaded images and thus have ratings on the quality of the images. Regardless of how the mappings are generated, an image search engine service inputs an image query and uses the mapping to find images that are related to the image query. An image search engine service may identify thousands of images that are related to an image query and presents thumbnails of the related images. To help a user view the images, an image search engine service may order the thumbnails based on relevance of the images to the image query. An image search engine service may also limit the number of images that are provided to a few hundred of the most relevant images so as not to overwhelm the viewer. Unfortunately, the relevance determination may not be particularly accurate because image queries may be ambiguous (e.g., "tiger" may represent the animal or the golfer), the keywords derived from web pages may not be very related to an image of the web page (e.g., a web page can contain many unrelated images), and so on.

A typical image search engine service may also suggest additional image queries to a user. For example, if a user submits "tiger" as an image query, an image search engine service may display thumbnails of images relating to "tiger" in relevance order. That image search engine service may also display the text of suggested image queries, such as "white tiger," "mystical tiger," "Tiger Woods," and so on. When a user selects one of the suggested image queries, that image search engine service searches for images relating to the selected image query and displays the thumbnails of the images as the search result. Such a user interface has several disadvantages. First, a user may not know from the text of the suggested image query whether the images relating to the suggested image query will be of interest to the user. For example, a user may not know from the suggested image query "mystical tiger" what type of images will be in the search result. Second, the ordering of the thumbnails based on relevance of the images to the image query may result in thumbnails for only one type of image being displayed (e.g., a Bengal tiger) in the first few pages of results. Thus, the user may need to view many pages to get a feel for the different types of images (e.g., a mystical tiger) that are related to the image query.

SUMMARY

A method and system for providing a user interface for presenting images of clusters of an image search result is provided. The user interface system is provided with clusters of images as the search result of an image query. The user interface system displays the search result in a cluster/view form using a cluster panel and a view panel. The cluster panel contains a cluster area for each cluster. The cluster area for a cluster may include the name of the cluster and mini-thumbnails of some of the images of the cluster. The view panel may contain thumbnails of images of the search result in a lucky view or a mix view. In the lucky view, the view panel contains thumbnails of images of a single cluster that may be arranged in a grid. In the mix view, the view panel contains thumbnails of images from multiple clusters that may also be arranged in a grid. When a user selects a cluster area from the cluster panel, the user interface system displays a list view of thumbnails for that cluster in the view panel.

The user interface system may display a thumbnail list near a cluster area of the cluster panel. The thumbnail list contains mini-thumbnails of the images of the selected cluster. When a user selects a mini-thumbnail from the thumbnail list, the user interface system may display a detail view of the corresponding image in the view panel.

The user interface system displays a detail view of an image in the view panel when a user selects an image. The detail view may include metadata associated with the image such as camera setting, photographer, and so on. The user interface system may also display a thumbnail scroll list in the view panel along with the detail view. A thumbnail scroll list contains mini-thumbnails of images. The user interface may select images to be included in a thumbnail scroll list based on the context in which the image of the detail view was selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
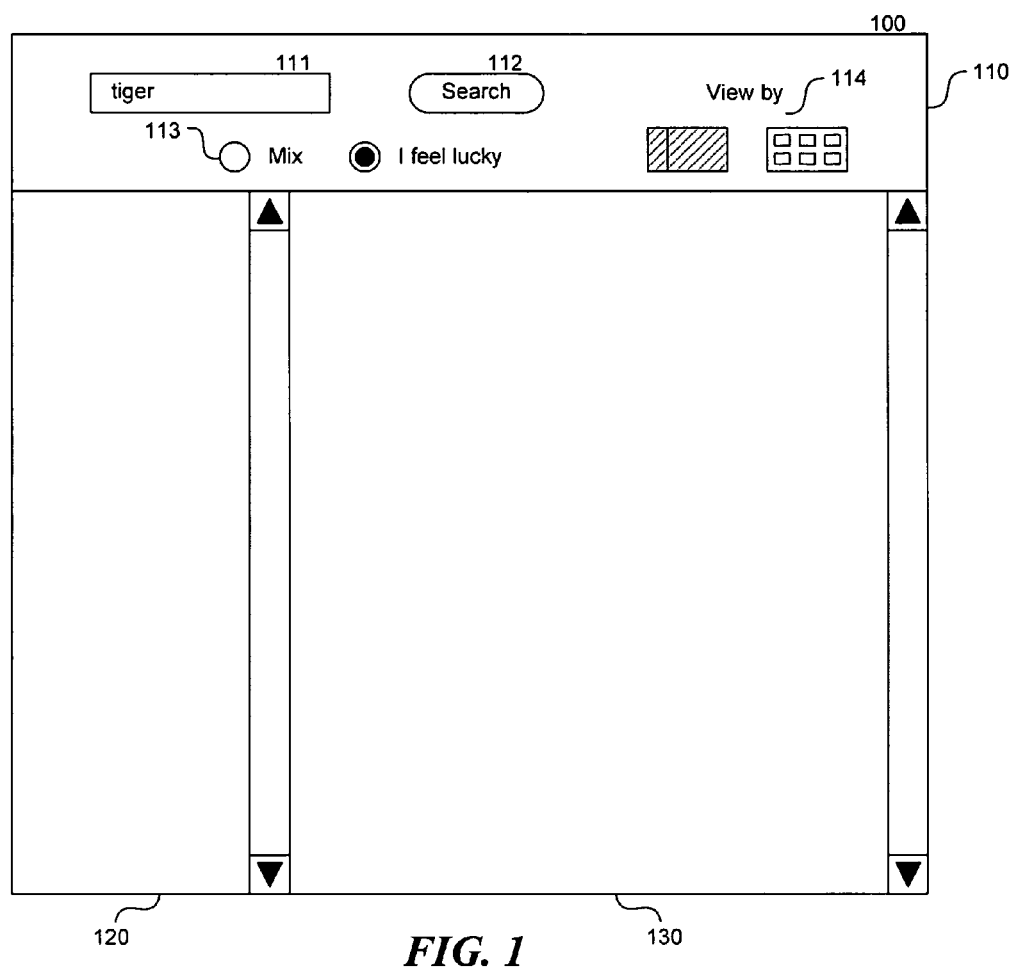
FIG. 1 illustrates a display page for submitting an image query in one embodiment.

A method and system for providing a user interface for presenting images of clusters of an image search result is provided. In one embodiment, the user interface system is provided with clusters of images as the search result of an image query. Each cluster of images includes a cluster name and for each image of the cluster, a thumbnail of the image, metadata associated with the image, and a link to the image. The images within a cluster may be ordered based on their relevance to the image query. The user interface system displays the search result in a cluster/view form using a cluster panel and a view panel. The cluster panel contains a cluster area for each cluster. The cluster area for a cluster may include the name of the cluster and mini-thumbnails of some of the images of the cluster. The cluster areas of the cluster panel may be ordered based on a relevance score of the images of the cluster to the image query or may be ordered based on the number of images in the cluster. The view panel may contain thumbnails of images of the search result in a list view or a mix view. In the list view, the view panel contains thumbnails of images of a single cluster that may be arranged in a grid. The thumbnails in list view may be ordered based on relevance of the corresponding images to the image query. In the mix view, the view panel contains thumbnails of images from multiple clusters that may also be arranged in a grid. The thumbnails in mix view may be ordered in an image relevance to cluster order in which the thumbnail of the most relevant image of each cluster is ordered first, followed by the thumbnail of the second most relevant image of each image cluster, and so on. The list view thus provides a view of the images of a single cluster, and the mix view provides a view of the most relevant images from each cluster. Moreover, the cluster panel allows a user to get an understanding of the images of each cluster from the mini-thumbnails of the cluster areas.

When a user selects a cluster area from the cluster panel, the user interface system displays a list view of thumbnails for that cluster in the view panel. The cluster panel and the view panel may contain scrollbars for scrolling the content of the panel.

In one embodiment, the user interface system may display a thumbnail list near a cluster area of the cluster panel. When a user selects a cluster (e.g., by right clicking on a cluster area), the user interface system displays a thumbnail list that may overlay a portion of the cluster panel and the view panel. The thumbnail list contains mini-thumbnails of the images of the selected cluster. For example, the user interface system may display in a rectangular area the mini-thumbnails for the 30 images with the highest relevance. The user interface system may position the rectangular area just below and to the right of the cluster area for the selected cluster. When a user selects a mini-thumbnail from the thumbnail list, the user interface system may display a detail view of the corresponding image in the view panel. If the user selects multiple mini-thumbnails from the thumbnail list, the user interface system may display thumbnails of the corresponding images in the view panel. The user interface system may also provide a scrollbar for the thumbnail list when a cluster contains more images than can be effectively displayed as mini-thumbnails at the same time.

In one embodiment, the user interface system displays a detail view of an image in the view panel when a user selects an image (e.g., by selecting a thumbnail from the view panel or mini-thumbnail from a thumbnail list). The detail view may include metadata associated with the image such as camera setting, photographer, and so on. The user interface system may also display a thumbnail scroll list in the view panel along with the detail view. A thumbnail scroll list contains mini-thumbnails of images. A user can scroll through the mini-thumbnails and select a mini-thumbnail of interest. When a user selects a mini-thumbnail, the user interface system displays in the view panel a detail view of the image associated with the selected mini-thumbnail. The user interface may select images to be included in a thumbnail scroll list based on the context in which the image of the detail view was selected. For example, if the image for the detail view was selected from a thumbnail within the view panel, then the images of the other thumbnails displayed in the view panel would be included in the thumbnail scroll list. If the view panel was in list view, then the images of the same cluster would be included in the thumbnail scroll list. If the view panel was in mix view, then the images of multiple clusters would be included in the thumbnail scroll list. If the image for the detail view was selected from a thumbnail list, then the images of the same cluster would be included in the thumbnail scroll list.

FIG. 1 illustrates a display page for submitting an image query in one embodiment. The display page 100 includes a query panel 110, a cluster panel 120, and a view panel 130. The cluster panel and view panel may be initially empty. A user submits an image query by entering the text of the image query in a query box 111 and selecting the search button 112. The view by area 114 is used to indicate whether the clusters should be presented in a cluster/view form or a box form. When the cluster/view form is selected the user interface system displays radio buttons 113. The user may select one of the radio buttons to indicate whether the search result should be displayed in mix view or lucky view. When the lucky view is selected, the user interface system may display the thumbnails of the images of the first cluster of the search result. The lucky view is a form of list view in that the user interface system selects the cluster (e.g., the first) whose thumbnails are to be displayed in the view panel. In this example, the mix view is selected as indicated by the selection of the mix view radio button, and the cluster/view form is selected as indicated by the shading in the view by area of the cluster/view form icon.

Figure 2:
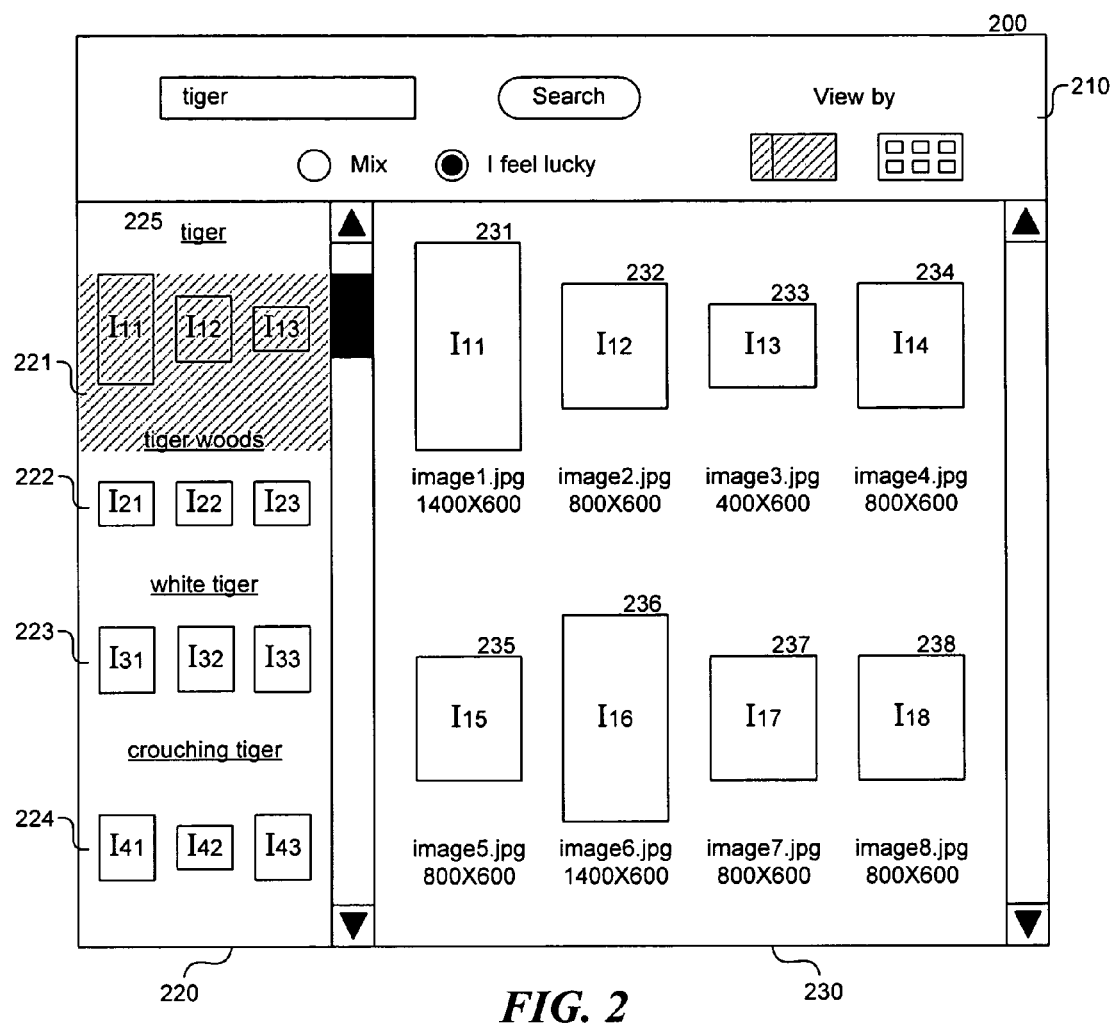
FIG. 2 illustrates a display page displaying images of a search result in cluster/view form in list view in one embodiment.

FIG. 2 illustrates a display page displaying images of a search result in cluster/view form in lucky view in one embodiment. A display page 200 includes a query panel 210, a cluster panel 220, and a view panel 230. The cluster panel includes cluster areas 221-224 and query link 225. Each cluster area includes a mini-thumbnail of the three most relevant images of the cluster along with the name of the cluster as a link. The images of the clusters are identified as Ic,n where c indicates the cluster number and n indicates the image number within the cluster. For example, if the first cluster has 50 images, then the images are identified as I1,1 through I1,50. Since each cluster area contains mini-thumbnails for the first three images of the cluster, the mini-thumbnails are identified as Ic,1, Ic,2, and Ic,3 where c is the cluster number. The view panel includes thumbnails 231-238 identified as I1,1 through I1,8 along with metadata of the corresponding images. The metadata may include, for example, the name of the file that contains the image and the resolution of the image. The view panel is displaying a lucky view of the search result as indicated by the selection of the lucky view radio button. The shading of cluster area 221 indicates that the thumbnails for images of that cluster are currently displayed in the view panel. If a user selects query link 225, the user interface system may display thumbnails of images of the first cluster when in lucky view or of multiple clusters when in mix view. Alternately, if the image search result has a relevance score for each image relative to the image query, then the user interface system may display thumbnails from multiple clusters in relevance score order, rather than image relevance to cluster order.

Figure 3:
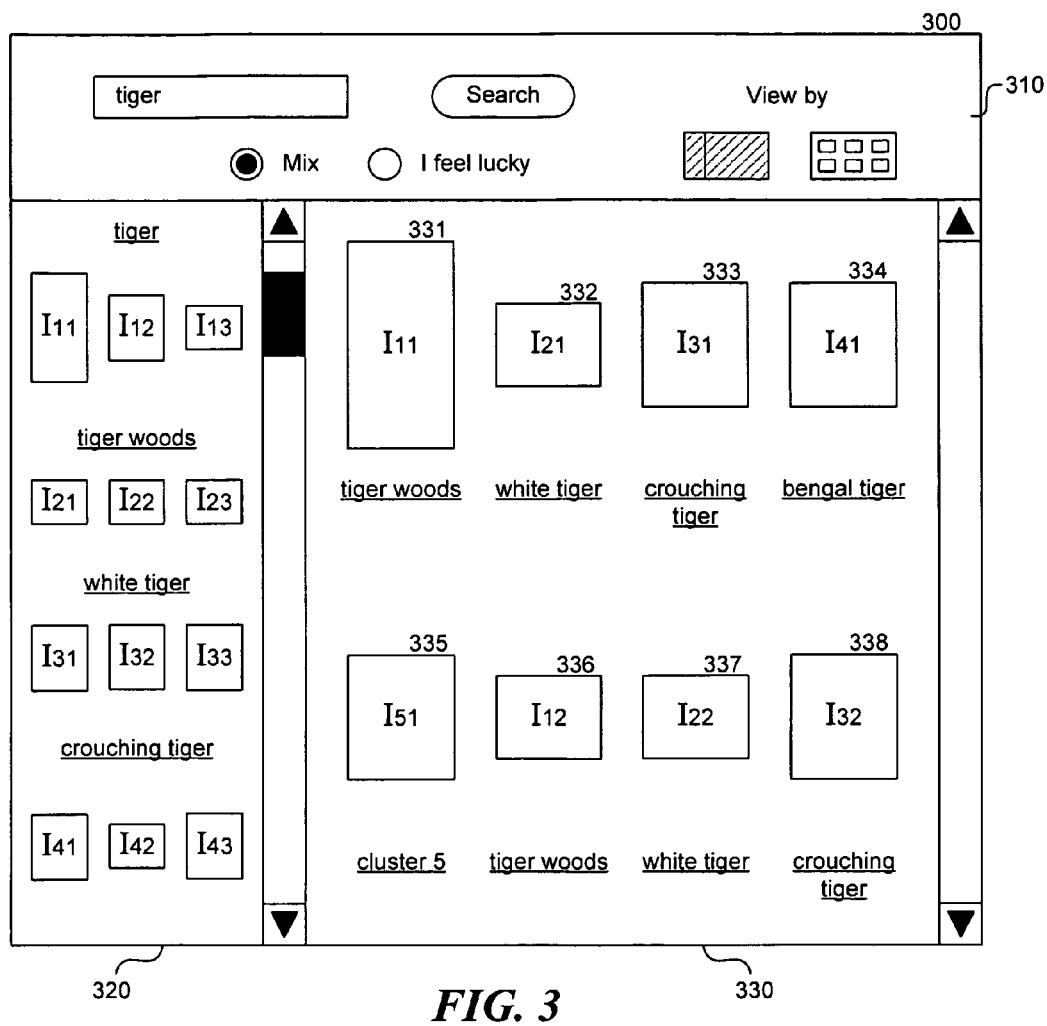
FIG. 3 illustrates a display page displaying images of a search result in mix view in one embodiment.

FIG. 3 illustrates a display page of images of a search result in mix view in one embodiment. A display page 300 includes a query panel 310, a cluster panel 320, and a view panel 330. The mix view is indicated by selection of the mix view radio button. The cluster panel contains the same content as that of FIG. 2. The view panel, however, displays thumbnails of images in mix view, that is, in image relevance to cluster order. The view panel contains thumbnails 331-338 for I1,1, I2,1, I3,1, I4,1, I5,1, I1,2, I2,2, and I3,2, respectively. The view panel may also include metadata associated with each thumbnail such as the name of the cluster that contains the image of the thumbnail, resolution of thumbnail, and so forth. The name of the cluster may also be a link that when selected, the user interface system display thumbnails of images of that cluster in the view panel.

Figure 4:
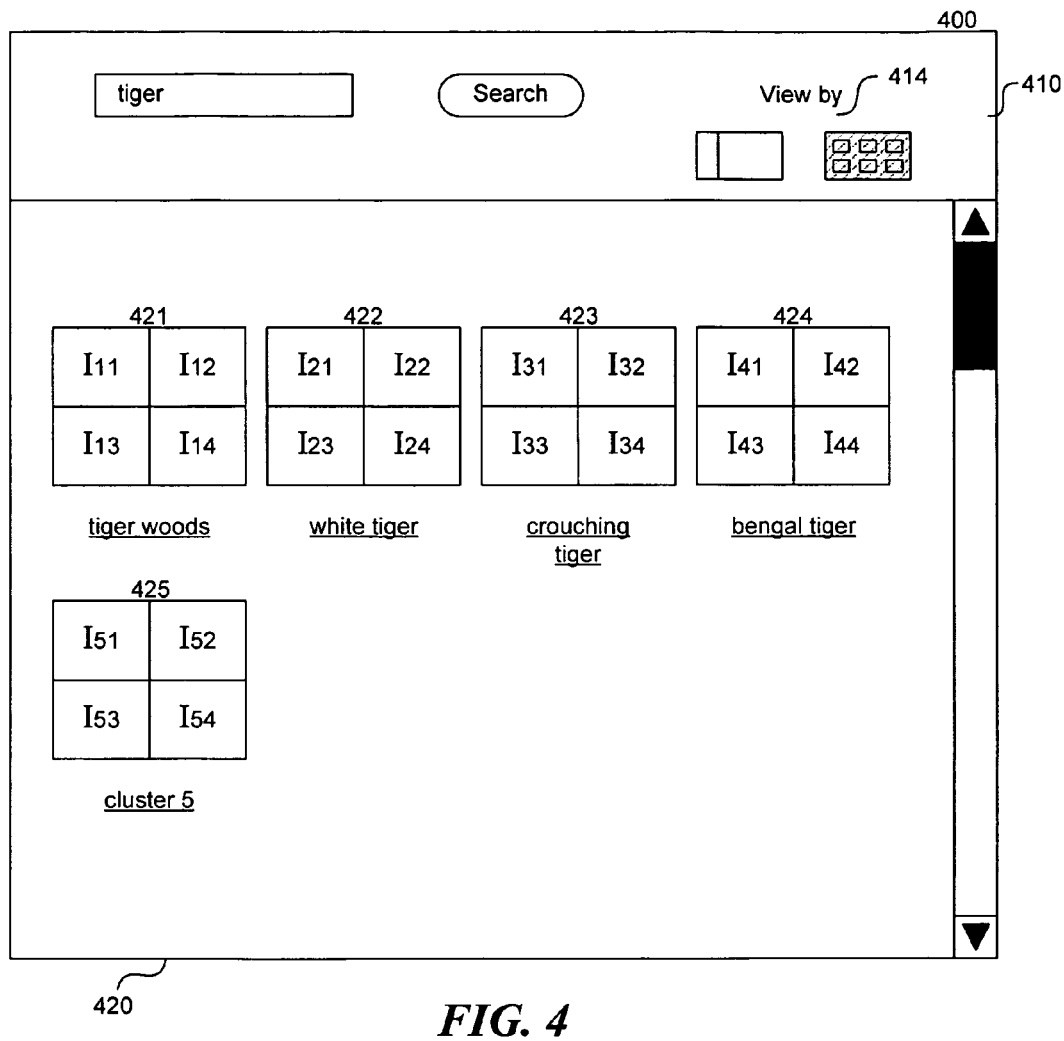
FIG. 4 illustrates a display page displaying clusters of a search result in a box form in one embodiment.

FIG. 4 illustrates a display page displaying clusters of a search result in a box form in one embodiment. A display page 400 includes a query panel 410 and a box panel 420. The box form is indicated by the shading of the box form icon in the view by area 414 of the query panel. The box panel contains a cluster area 421-425 for each cluster arranged in a grid. Each cluster area includes a mini-thumbnail for each of the four most relevant images arranged in a rectangle or box. Each cluster area also contains the name of the cluster. For example, cluster area 421 contains the name "Tiger Woods." When a user selects one of the cluster areas, the user interface displays thumbnails of the images of the cluster in a grid within the box panel.

Figure 5:
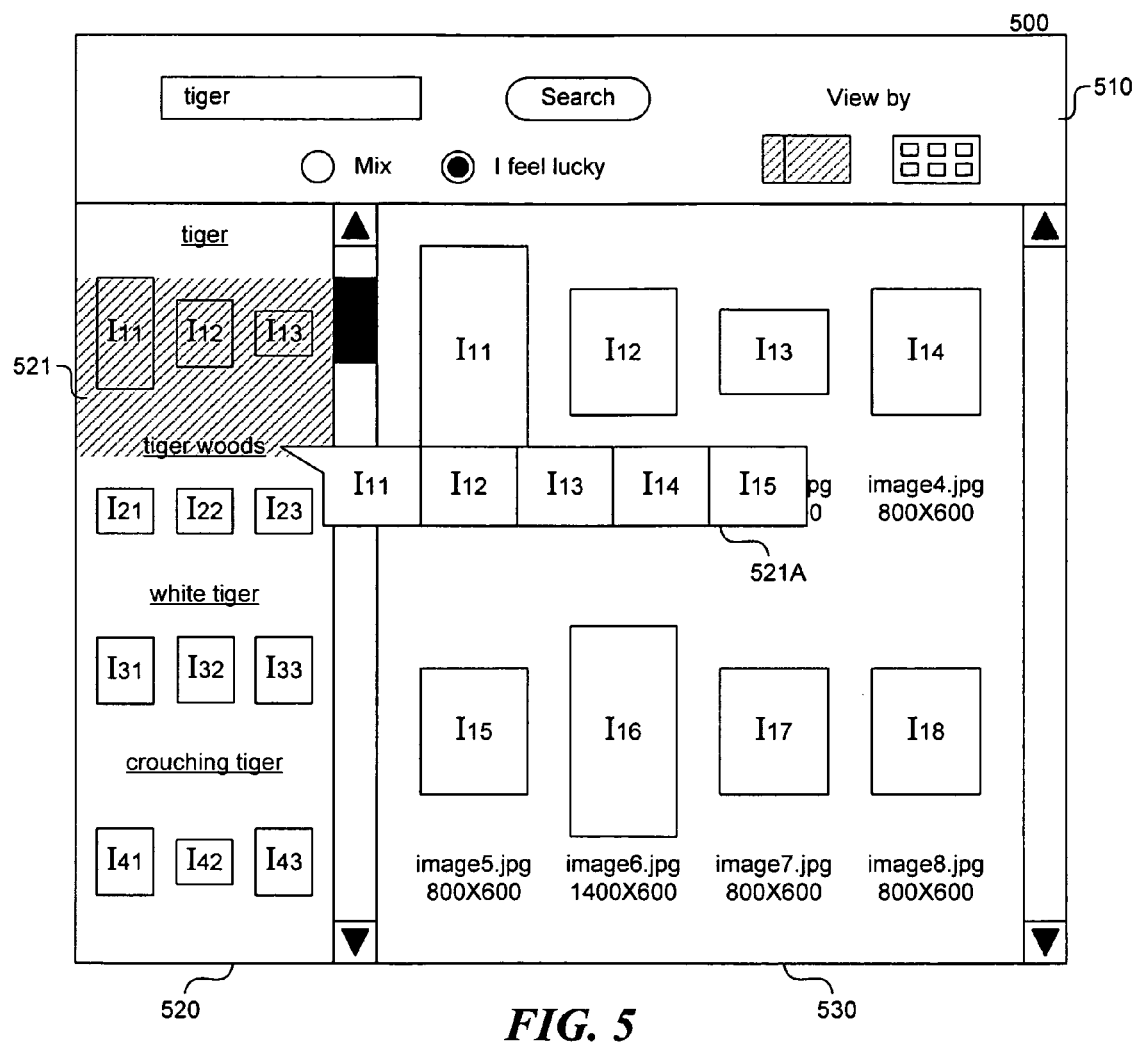
FIG. 5 illustrates a display page displaying a thumbnail list for a cluster area in one embodiment.

FIG. 5 illustrates a display page displaying a thumbnail list for a cluster area in one embodiment. The display page 500 includes a query panel 510, a cluster panel 520, and a view panel 530. When a user selects the cluster area 521, for example, by right clicking on or mouse hovering over the cluster area, the user interface system displays thumbnail list 521A near the cluster area. The thumbnail list contains mini-thumbnails for images of the cluster. When a user selects one of the mini-thumbnails, the user interface system displays a detail view of the image of the selected mini-thumbnail. The thumbnail list for any cluster area can be displayed to view more mini-thumbnails than are displayed in a cluster area and to allow selection of one or more of the mini-thumbnails.

Figure 6:
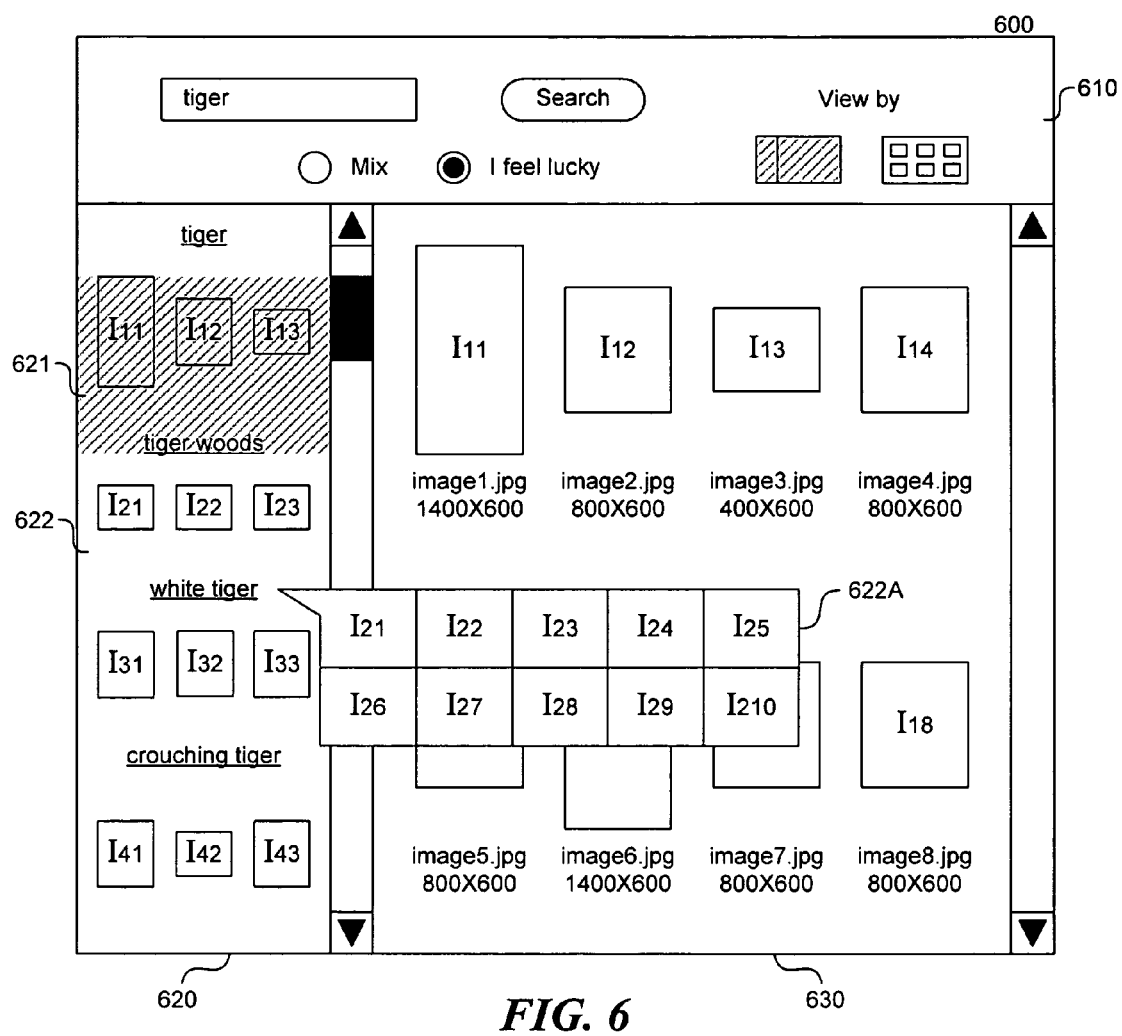
FIG. 6 illustrates a display page displaying a thumbnail list for a cluster area in one embodiment.

FIG. 6 illustrates a display page displaying a thumbnail list for a cluster area in one embodiment. The display page 600 includes a query panel 610, a cluster panel 620, and a view panel 630. When a user selects the cluster area 622, the user interface system displays thumbnail list 622A near the cluster area. The thumbnail list contains mini-thumbnails for images of the clusters. In this example, the view panel displays the thumbnails for the images of cluster area 621 as indicated by the shading, and the thumbnail list for cluster area 622 overlays the thumbnails of the view panel.

Figure 7:
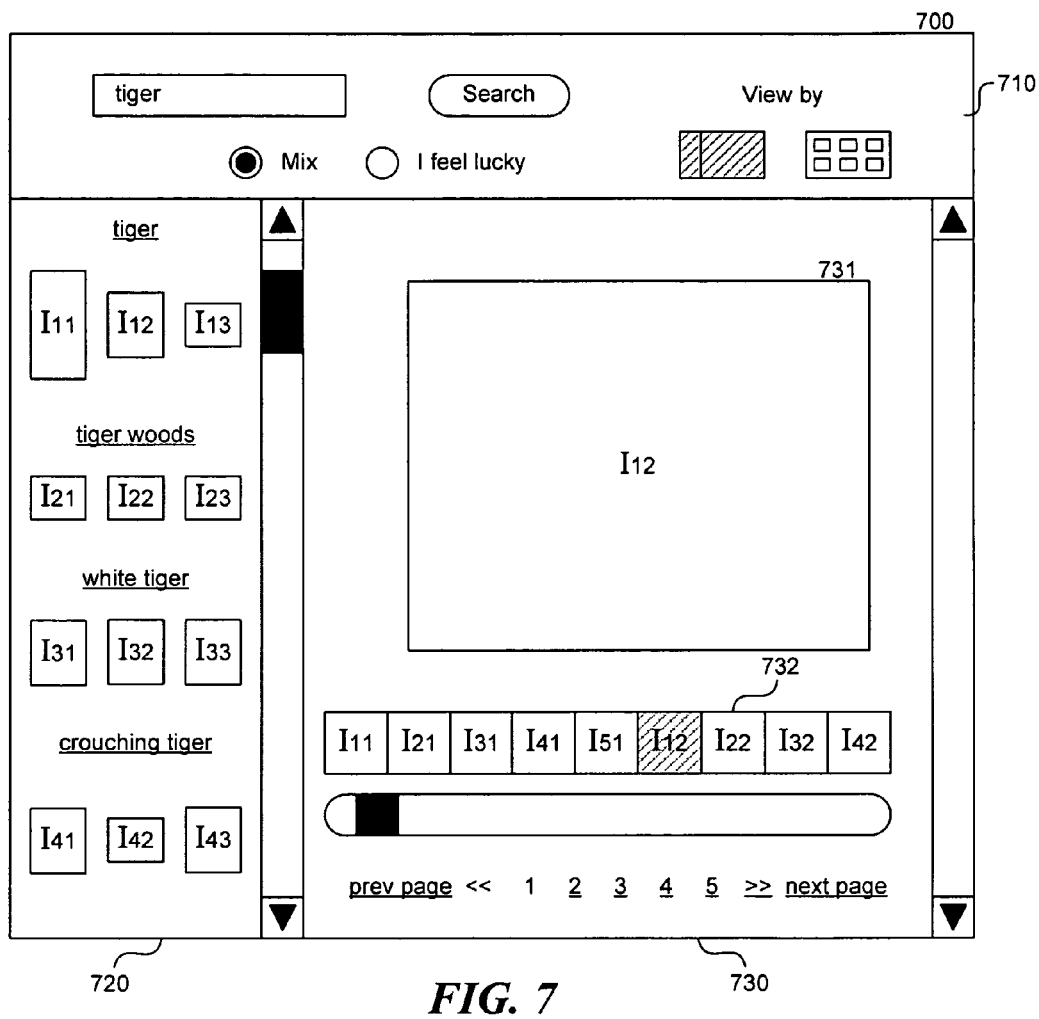
FIG. 7 illustrates a display page displaying a detail view of an image in one embodiment.

FIG. 7 illustrates a display page displaying a detail view in cluster/view form of an image in one embodiment. The display page 700 includes a query panel 710, a cluster panel 720, and a view panel 730. (In box form, the cluster panel would not be displayed.) The view panel contains a detail view of the second image of the first cluster $I_{1,2}$. The detail view includes image 731 and thumbnail scroll list 732. The thumbnail scroll list includes a mini-thumbnail of images associated with the context from which the image of the detail view was selected. In this example, the image was selected from a thumbnail for $I_{1,2}$ in a mix view. As a result, the thumbnail scroll list includes mini-thumbnails of images from the different clusters. In other cases, the thumbnail scroll list contains thumbnails of images of the same cluster as the selected image. When a user selects multiple thumbnails from a thumbnail list, the user interface may place each of the selected thumbnails in the thumbnail list and display a detail view of one of the images. A user can use the scroll bar of the thumbnail scroll list to scroll through the mini-thumbnails of the associated images. When a user selects a mini-thumbnail, the user interface displays a detail view of the image. The detail view may also include detailed metadata associated with the image including the name of the cluster that contains the image, the filename of the image, the resolution of the image, file size of the image, date of creation, and so on.

Figure 8:
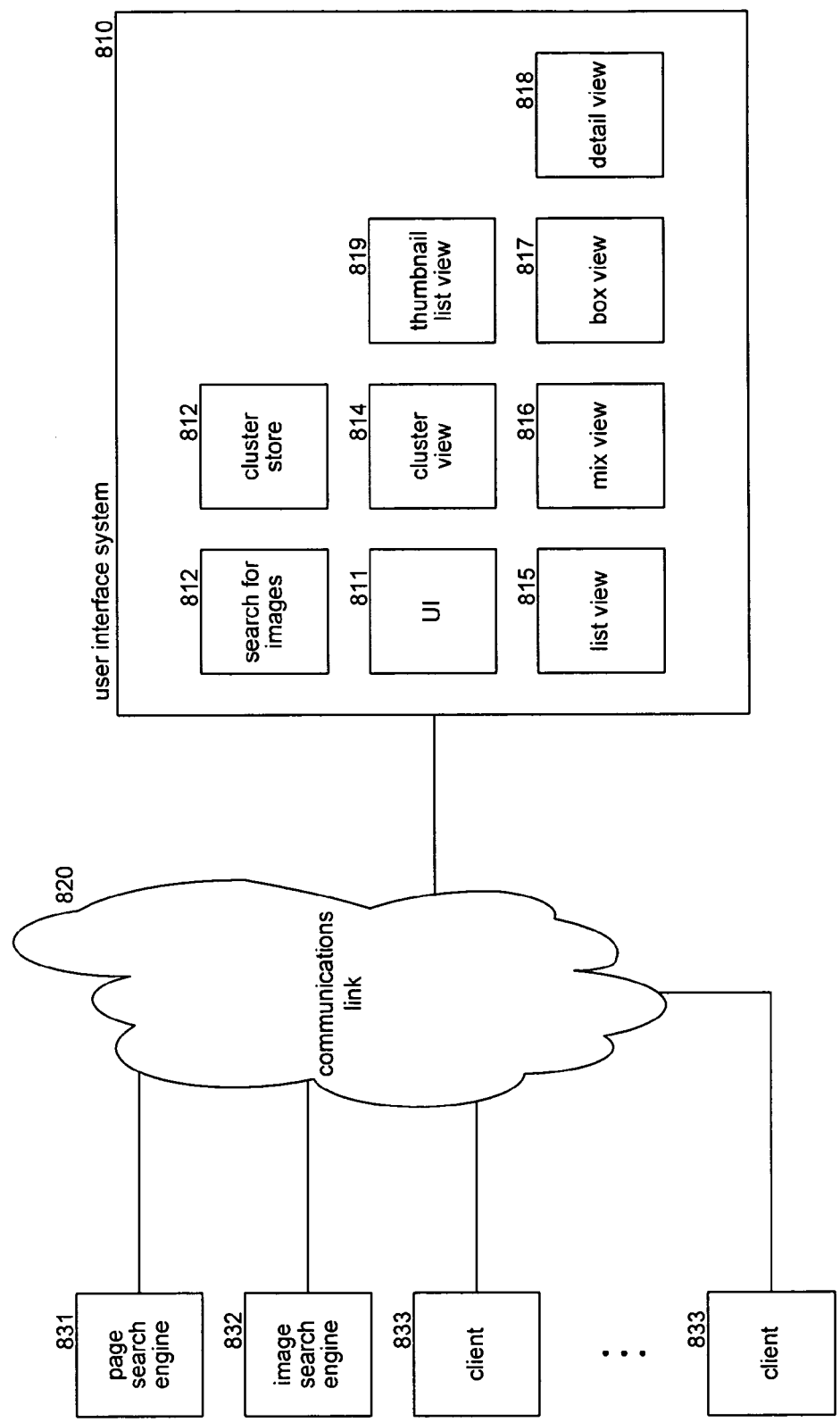
FIG. 8 is a block diagram that illustrates components of the user interface system in one embodiment.

FIG. 8 is a block diagram that illustrates components of the user interface system in one embodiment. The user interface system 810 is connected via a communications link 820 to a page search engine 831, an image search engine 832, and client computing devices 833. The user interface system includes a user interface component 811 and a search for images component 812. The search for images component is provided with an image query and generates a search result for the image query that includes clusters of images that are stored in a cluster store 813. The search for images component may submit the text of the image query to a conventional page search engine and receive a web page containing links to web pages along with snippets describing the web pages. The search for image component may identify key phrases from the web page and then submit each key phrase as an image query to an image search engine. The images of the search result for each key phrase correspond to a cluster that has the name of the key phrase. The search for images component is described in more detail in U.S. patent application Ser. No. 11/337,825, entitled "Generating Clusters of Images for Search Results" and filed concurrently, which is hereby incorporated by reference. The user interface system may, however, be used with any image search result that clusters images. The cluster store may contain an entry for each cluster that includes the name of the cluster and for each image of the cluster, a thumbnail, metadata, link to the image, and so on. The user interface system may generate mini-thumbnails as needed from the thumbnails. The thumbnails and mini-thumbnails can be of any size, and a mini-thumbnail can be the same size as a thumbnail.

The user interface component displays a query panel and submits an image query to the search for images component. Upon receiving the search result, the user interface component invokes the appropriate components to display the search result. The components for displaying the search result in different ways are a cluster view component 814, a list view component 815, a mix view component 816, a box view component 817, a detail view component 818, and a thumbnail list view component 819. The cluster view component controls the displaying of the cluster panel. The list view component controls the displaying of the view panel in list view. The mix view component controls the displaying of the view panel in mix view. The box view component controls the displaying of the box panel. The detail view component controls the displaying of the detail view of an image. The thumbnail list view component controls the displaying of a thumbnail list.

The computing devices on which the user interface system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the user interface system. In addition, the data structures and message structures may be stored or transmitted via a data transmission medium, such as a signal on a communications link. Various communications links may be used, such as the Internet, a local area network, a wide area network, or a point-to-point dial-up connection.

The user interface system may provide a user interface to various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The user interface system may also provide its services to various computing systems such as personal computers, cell phones, personal digital assistants, consumer electronics, home automation devices, and so on.

The user interface system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 9:
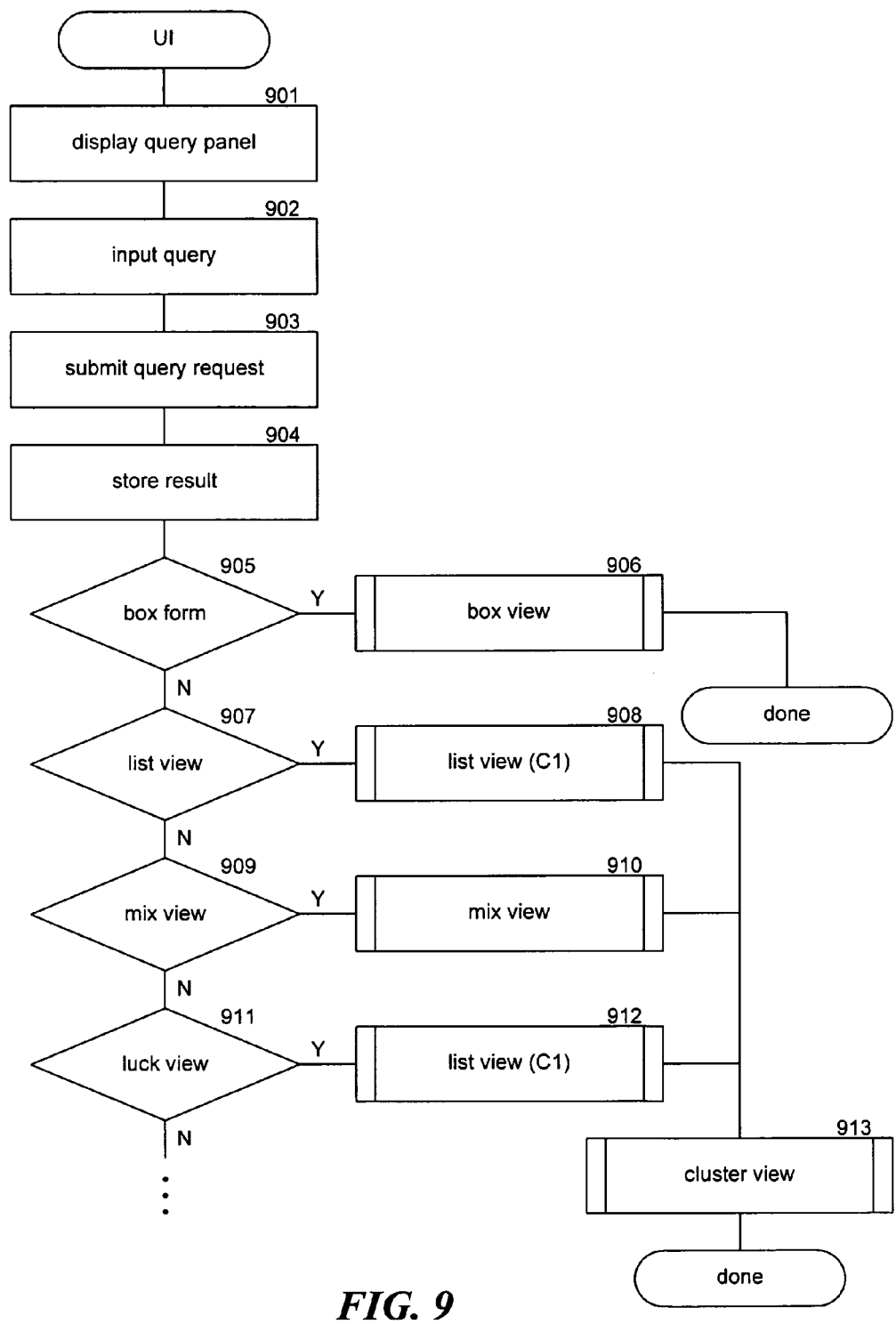
FIG. 9 is a flow diagram that illustrates the processing of the user interface component of the user interface system in one embodiment.

FIG. 9 is a flow diagram that illustrates the processing of the user interface component of the user interface system in one embodiment. In block 901, the component displays a query panel. In block 902, the component inputs an image query from a user. In block 903, the component submits the image query to the search for images component. In block 904, the component stores the search results in the cluster store. In decision block 905, if the box form is currently selected, then the component continues at block 906, else the component continues at block 907. In block 906, the component invokes the box view component to display a box form of the clusters and then completes. In decision block 907, the cluster/view form is selected. If list view is to be displayed, then the component continues at block 908, else the component continues at block 909. In block 908, the component invokes the list view component passing an indication to display thumbnails of the first cluster in the view panel. In decision block 909, if the mix view is to be displayed, then the component continues at block 910, else the component continues at block 911. In block 910, the component invokes the mix view component to display thumbnails for the mix view in the view panel. In block 911, if the lucky view is to be displayed, then the component continues at block 912, else the component continues further processing. In block 912, the component invokes the list view component passing an indication to display the thumbnails of the first cluster. In block 913, the component invokes the cluster view component to generate the display for the cluster panel and then completes.

Figure 10:
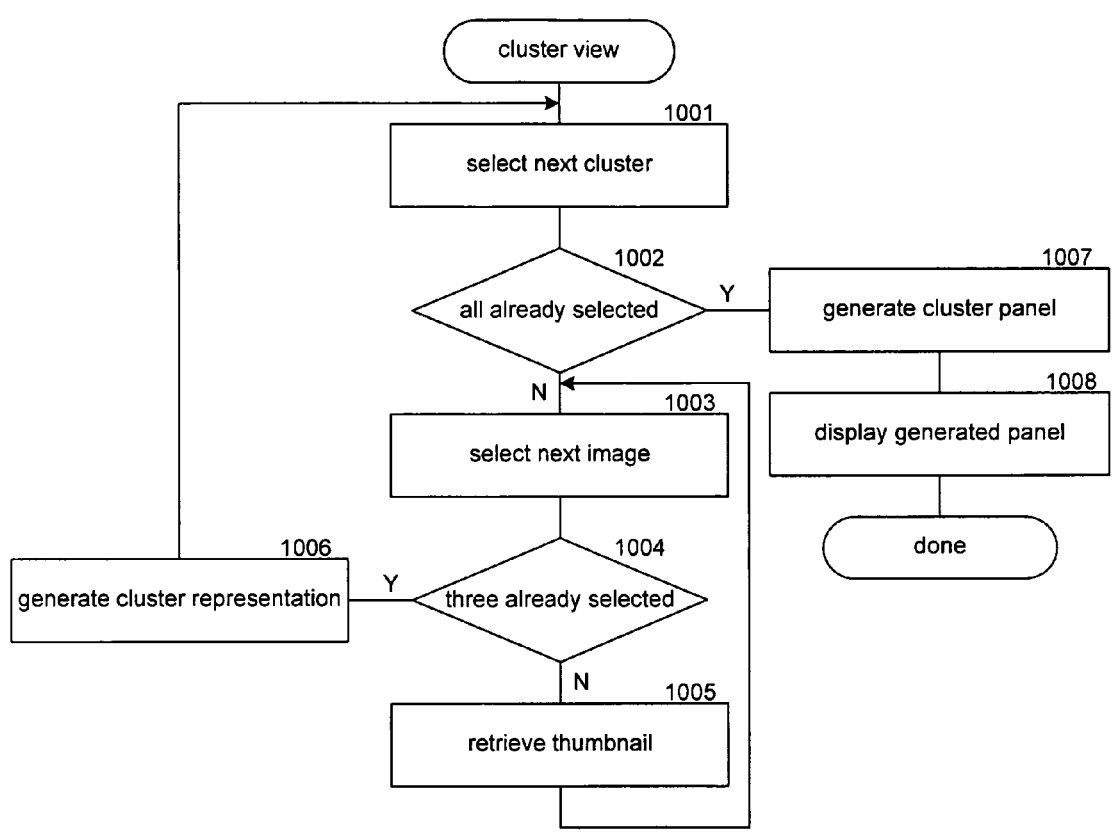
FIG. 10 is a flow diagram that illustrates the processing of the cluster view component of the user interface system in one embodiment.

FIG. 10 is a flow diagram that illustrates the processing of the cluster view component of the user interface system in one embodiment. The component loops selecting each cluster and generating a cluster area for the cluster panel. In block 1001, the component selects the next cluster. In decision block 1002, if all the clusters have already been selected, then the component continues at block 1007, else the component continues at block 1003. In block 1003, the component selects the next image of the selected cluster starting with the first image. In decision block 1004, if three images have already been selected for the selected cluster, then the component continues at block 1006, else the component continues at block 1005. In block 1005, the component retrieves the thumbnail for the selected image and then loops to block 1003 to select the next image. In block 1006, the component generates the cluster area for the selected cluster and then loops to block 1001 to select the next cluster. In block 1007, the component generates the cluster panel. In block 1008, the component displays the generated panel and then completes.

Figure 11:
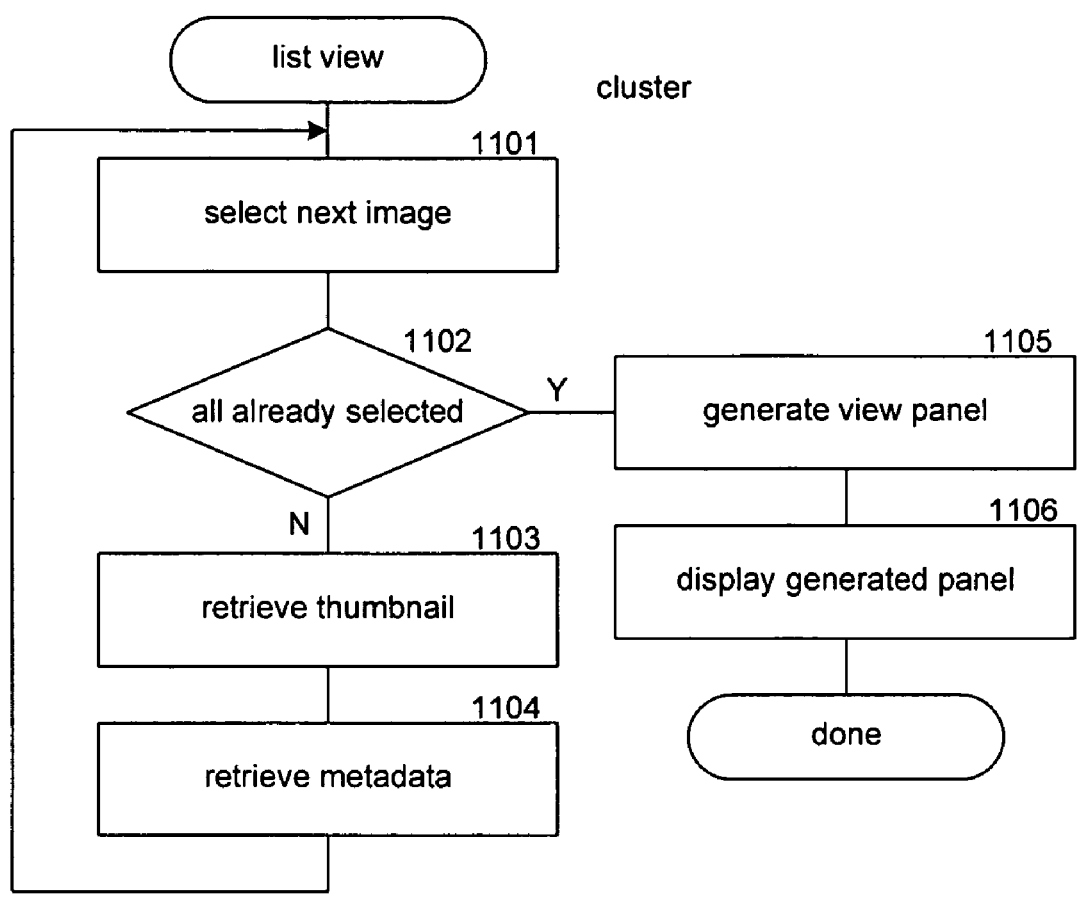
FIG. 11 is a flow diagram that illustrates the processing of the list view component of the user interface system in one embodiment.

FIG. 11 is a flow diagram that illustrates the processing of the list view component of the user interface system in one embodiment. The component loops selecting images of the passed cluster. In block 1101, the component selects the next image of the passed cluster. In decision block 1102, if all the images of the passed cluster have already been selected, then the component continues at block 1105, else the component continues at block 1103. In block 1103, the component retrieves the thumbnail for the selected image. In block 1104, the component retrieves metadata for the selected image and then loops to block 1101 to select the next image. In block 1105, the component generates the view panel for the list view. In block 1106, the component displays the generated panel and then completes.

Figure 12:
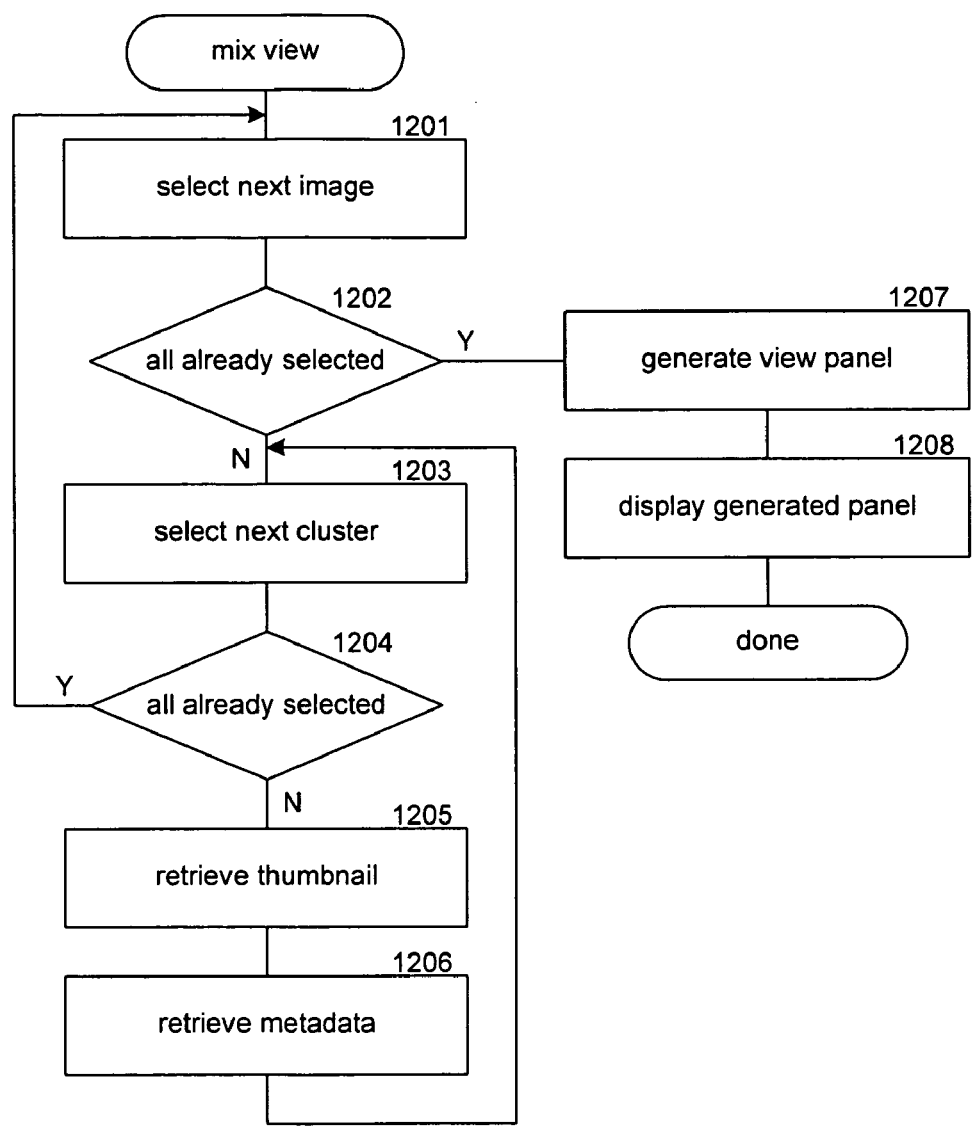
FIG. 12 is a flow diagram that illustrates the processing of the mix view component of the user interface system in one embodiment.

FIG. 12 is a flow diagram that illustrates the processing of the mix view component of the user interface system in one embodiment. The component loops selecting images from the various clusters and generating a mix view using an image relevance to cluster order. In block 1201, the component selects the next image starting with the first image. In block 1202, if all the images have already been selected, then the component continues at block 1207, else the component continues at block 1203. In block 1203, the component selects the next cluster starting with the first cluster. In decision block 1204, if all the clusters have already been selected for the selected image, then the component loops to block 1201 to select the next image, else the component continues at block 1205. In block 1205, the component retrieves the thumbnail for the selected image of the selected cluster. In block 1206, the component retrieves the metadata for the selected image of the selected cluster. The component then loops to block 1203 to select the next cluster. In block 1207, the component generates a view panel for the mix view. In block 1208, the component displays the generated view panel and then completes.

Figure 13:
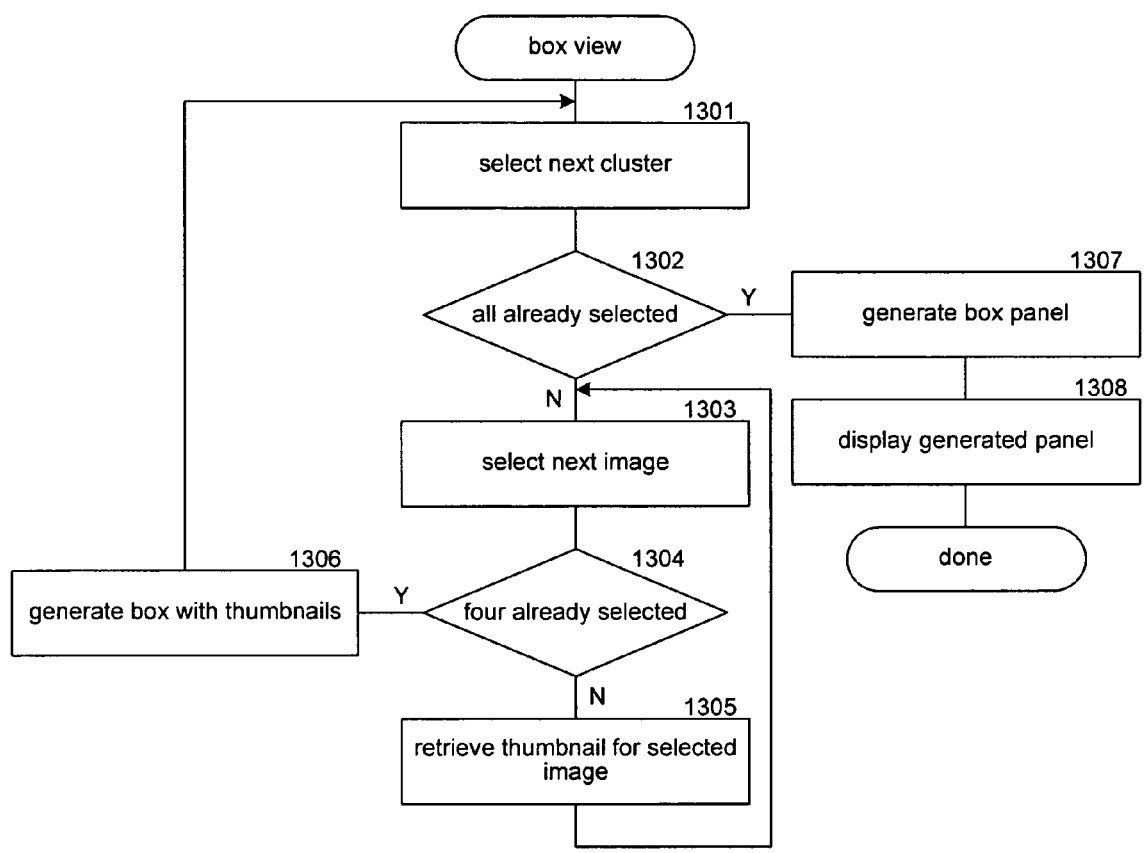
FIG. 13 is a flow diagram that illustrates the processing of the box view component of the user interface system in one embodiment.

FIG. 13 is a flow diagram that illustrates the processing of the box view component of the user interface system in one embodiment. The component loops selecting each cluster and images within each cluster to generate a box form. In block 1301, the component selects the next cluster. In decision block 1302, if all the clusters have already been selected, then the component continues at block 1307, else the component continues at block 1303. In block 1303, the component selects the next image of the selected cluster. In decision block 1304, if four of the images for the selected cluster have already been selected, then the component continues at block 1306, else the component continues at block 1305. In block 1305, the component retrieves the thumbnail for the selected image of the selected cluster and then loops to block 1303 to select the next image. In block 1306, the component generates a box of the selected thumbnails and then loops to block 1301 to select the next cluster. In block 1307, the component generates the box panel with the boxes of the clusters in a grid. In block 1308, the component displays the generated panel and then completes.

Figure 14:
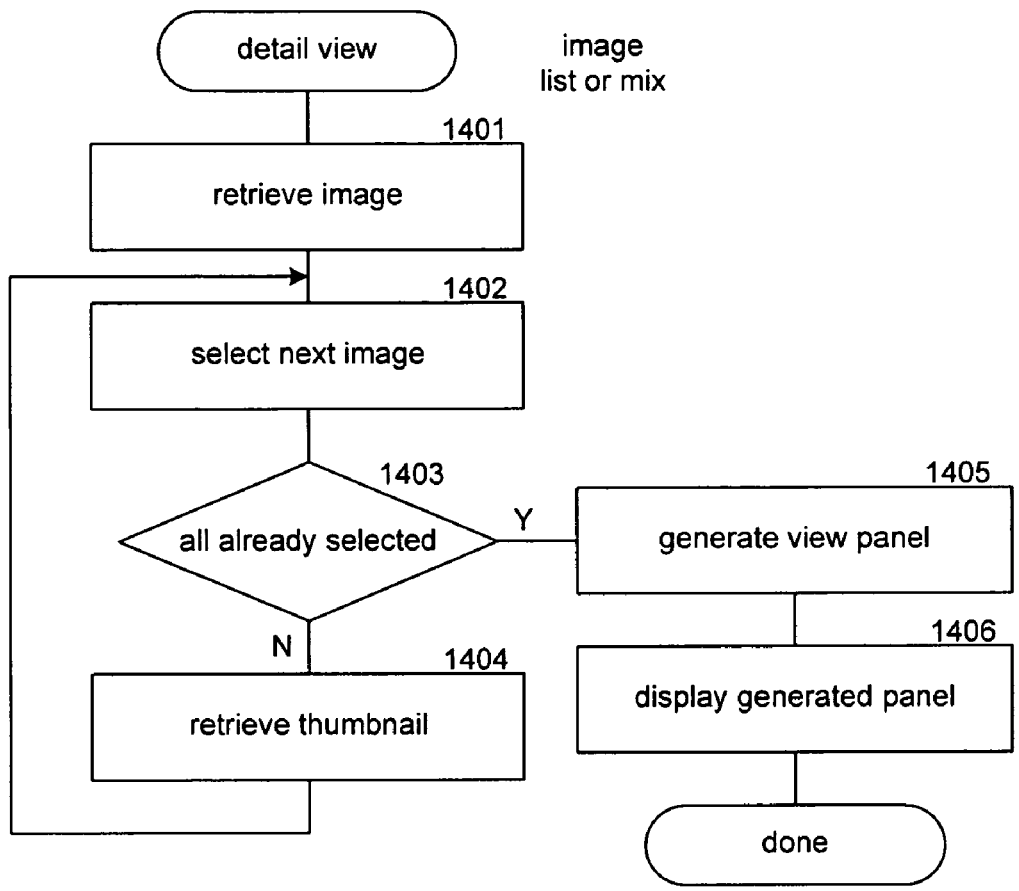
FIG. 14 is a flow diagram that illustrates the processing of the detail view component of the user interface system in one embodiment.

FIG. 14 is a flow diagram that illustrates the processing of the detail view component of the user interface system in one embodiment. The component is passed an image and an indication of whether the image was selected from a list or a mix view. In block 1401, the component retrieves the image. In block 1402, the component selects the next image associated with the list or mix view. In decision block 1403, if all the images have already been selected, then the component continues at block 1405, else the component continues at block 1404. In block 1404, the component retrieves the thumbnail for the selected image for use in the thumbnail scroll list. The component then loops to block 1402 to select the next image. In block 1405, the component generates a view panel for a detail view. In block 1406, the component displays the generated panel and then completes.

Figure 15:
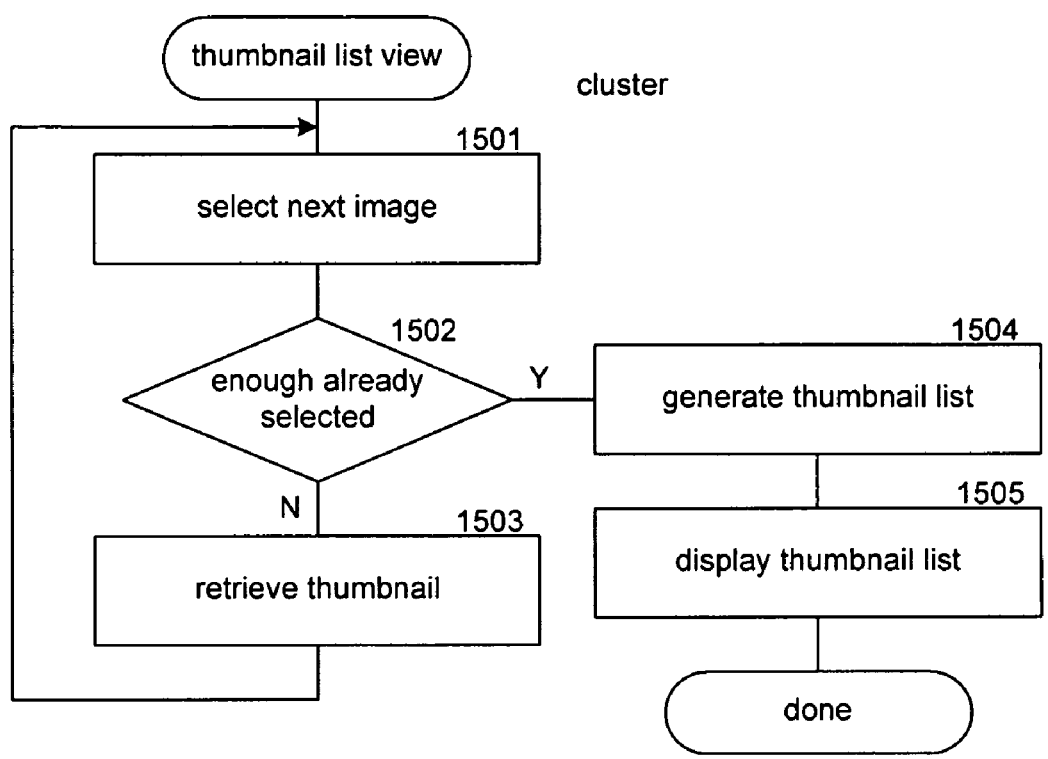
FIG. 15 is a flow diagram that illustrates the processing of the thumbnail list view component of the user interface system in one embodiment.

FIG. 15 is a flow diagram that illustrates the processing of the thumbnail list view component of the user interface system in one embodiment. The component is passed an indication of a cluster and generates a thumbnail list for that cluster. In block 1501, the component selects the next image of the cluster starting with the first image. In decision block 1502, if all images have been selected for the thumbnail list, then the component continues at block 1504, else the component continues at block 1503. In block 1503, the component retrieves a mini-thumbnail for the selected image and then loops to block 1501 to select the next image. In block 1504, the component generates the thumbnail list using the retrieved mini-thumbnails. In block 1505, the component displays the generated thumbnail list and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The user interface system may be used to present content of various types, such as photographs, drawings, artwork, videos, music, and so on. Accordingly, the invention is not limited except as by the appended claims.

We claim:

1. A method for presenting an image search result having clusters of images, the method comprising:
receiving a image search query;
identifying an image search result of images that are relevant the image search query, each image having an relevance score indicating relevance of the image to the image query search, the images being organized into clusters;
displaying in a cluster panel a cluster indication of each cluster, the cluster indication including thumbnails of multiple images from the cluster, the cluster indications being ordered based on relevance of the images in the cluster to the image search query;
when in mix view, displaying in a view panel thumbnails of the images of the clusters in which the images of all the clusters are ordered into a combined ordering such that the most relevant image taken from each cluster are listed first in the combined ordering followed by a listing of the second most relevant image taken from each cluster in the combined ordering, wherein the other images of all the clusters are further listed in the combined ordering in an order based on relevance of each image within its the cluster; and
when in list view,
when a user selects a cluster indication using a first selection, displaying in the view panel thumbnails of images of the cluster corresponding to the selected cluster indication;
when a user selects a cluster indication using a second selection, displaying adjacent to the selected cluster indication a mini-thumbnail of images of the cluster corresponding to the selected cluster indication; and
when a user selects a thumbnail of an image, displaying a detail view of that image in the view panel.

2. The method of claim 1 including displaying along with the detail view a thumbnail scroll list of the thumbnails of the view panel when the user selected the thumbnail.

3. A computer-readable storage medium containing computer-executable instructions for controlling a computer to present an image search result having clusters of images, by a method comprising:
receiving an image search query;
identifying an image search result of images that are relevant to the image search query, each image having a relevance score indicating relevance of the image to the image query search, the images being organized into clusters;
displaying in a cluster panel a cluster indication of each cluster, the cluster indication including thumbnails of multiple images from the cluster, the cluster indications being ordered based on relevance of the images in the cluster to the image search query;
when in mix view, displaying in a view panel thumbnails of the images of the clusters in which the images of all the clusters are ordered into a combined ordering such that the most relevant image taken from each cluster are listed first in the combined ordering followed by a listing of the second most relevant image taken from each cluster in the combined ordering, wherein the other images of all the clusters are further listed in the combined ordering in an order based on relevance of each image within its the cluster; and
when in list view,
when a user selects a cluster indication using a first selection, displaying in the view panel thumbnails of images of the cluster corresponding to the selected cluster indication;
when a user selects a cluster indication using a second selection, displaying adjacent to the selected cluster indication a mini-thumbnail of images of the cluster corresponding to the selected cluster indication; and when a user selects a thumbnail of an image, displaying a detail view of that image in the view panel.

4. The computer-readable storage medium of claim 3 including displaying along with the detail view a thumbnail scroll list of the thumbnails of the view panel when the user selected the thumbnail.

5. A computing device for an image search result having clusters of images, comprising:

a memory storing computer-executable instructions comprising:

a component that receives an image search query;

a component that identifies an image search result of images that are relevant to the image search query, each image having a relevance score indicating relevance of the image to the image query search, the images being organized into clusters;

a component that displays in a cluster panel a cluster indication of each cluster, the cluster indication including thumbnails of multiple images from the cluster, the cluster indications being ordered based on relevance of the images in the cluster to the image search query;

a component that, when in mix view, displays in a view panel thumbnails of the images of the clusters in which the images of all the clusters are ordered into a combined ordering such that the most relevant image taken from each cluster are listed first in the combined ordering followed by a listing of the second most relevant image taken from each cluster in the combined ordering, wherein the other images of all the clusters are further listed in the combined ordering in an order based on relevance of each image within its the cluster; and a component that, when in list view, when a user selects a cluster indication using a first selection, displays in the view panel thumbnails of images of the cluster corresponding to the selected cluster indication;

when a user selects a cluster indication using a second selection, displays adjacent to the selected cluster indication a mini-thumbnail of images of the cluster corresponding to the selected cluster indication; and when a user selects a thumbnail of an image, displays a detail view of that image in the view panel;

a processor for executing the computer-executable instructions stored in memory.

6. The computing device of claim 5 including a component that displays along with the detail view a thumbnail scroll list of the thumbnails of the view panel when the user selected the thumbnail.

* * * * *

UNITED STATES PATENT AND TRADEMARK OFFICE
CERTIFICATE OF CORRECTION

PATENT NO. : 7,644,373 B2
APPLICATION NO. : 11/337945
DATED : January 5, 2010
INVENTOR(S) : Jing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Sixteenth Day of November, 2010

David J. Kappos
*Director of the United States Patent and Trademark Office*